(12) United States Patent
Wilkins

(10) Patent No.: US 9,352,256 B2
(45) Date of Patent: May 31, 2016

(54) FILTRATION SYSTEMS AND METHODS FOR FILTERING PARTICLES OF A PREDETERMINED SUBSTANCE

(71) Applicant: The Boeing Company, Chicago, IL (US)

(72) Inventor: Donald F. Wilkins, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 555 days.

(21) Appl. No.: 13/804,447

(22) Filed: Mar. 14, 2013

(65) Prior Publication Data

US 2014/0263102 A1    Sep. 18, 2014

(51) Int. Cl.
```
B01D 35/00    (2006.01)
B03C 1/00     (2006.01)
B03C 1/02     (2006.01)
B03C 3/00     (2006.01)
B03C 5/00     (2006.01)
B03C 5/02     (2006.01)
B01L 3/00     (2006.01)
```
(52) U.S. Cl.
CPC ........... *B01D 35/00* (2013.01); *B01L 3/502753* (2013.01); *B03C 1/00* (2013.01); *B03C 1/02* (2013.01); *B03C 3/00* (2013.01); *B03C 5/00* (2013.01); *B03C 5/02* (2013.01); *B01L 2200/0652* (2013.01); *B01L 2400/0415* (2013.01)

(58) Field of Classification Search
CPC ............ B01D 35/00; B03C 1/00; B03C 1/02; B03C 3/00; B03C 5/00; B03C 5/02; B01L 3/502753; B01L 2200/0652; B01L 2400/0415
See application file for complete search history.

(56) References Cited

U.S. PATENT DOCUMENTS

| | | | |
|---|---|---|---|
| 4,651,343 A | | 3/1987 | Laor |
| 6,110,247 A | * | 8/2000 | Birmingham .......... B01D 45/08 55/442 |
| 6,317,206 B1 | | 11/2001 | Wulf |
| 6,585,442 B2 | | 7/2003 | Brei et al. |
| 7,195,872 B2 | | 3/2007 | Agrawal et al. |
| 7,884,530 B2 | | 2/2011 | Aizenberg et al. |
| 2002/0186956 A1 | | 12/2002 | Lowry |
| 2004/0122328 A1 | | 6/2004 | Wang et al. |
| 2007/0279367 A1 | | 12/2007 | Kitai |
| 2010/0053727 A1 | | 3/2010 | Lee et al. |

(Continued)

FOREIGN PATENT DOCUMENTS

| | | |
|---|---|---|
| EP | 2177558 A1 | 4/2010 |
| WO | 2012059828 A2 | 5/2012 |
| WO | 2014078507 A1 | 5/2014 |

OTHER PUBLICATIONS

EPO Extended Search Report for related application No. 14155649.8-1553 dated Aug. 26, 2014, 7 pp.

(Continued)

*Primary Examiner* — David A Reifsnyder
(74) *Attorney, Agent, or Firm* — Armstrong Teasdale LLP

(57) ABSTRACT

A filtration system is provided. The filtration system includes a filter media including a plurality of apertures defined therein, and an array of micropillars. Each micropillar is substantially aligned with one of the plurality of apertures and is configured to be repelled by particles of a predetermined substance entrained in a flow channeled through the filtration system.

20 Claims, 5 Drawing Sheets

(56) References Cited

U.S. PATENT DOCUMENTS

| | | |
|---|---|---|
| 2012/0168233 A1 | 7/2012 | Clark |
| 2012/0314445 A1 | 12/2012 | Masuda |
| 2013/0172671 A1 | 7/2013 | Rentschler et al. |
| 2014/0246321 A1 | 9/2014 | Tsukada et al. |

OTHER PUBLICATIONS

Moon, Myoung-Woon et al., Tilted Janus Polymer Pillars; Soft Matter, 2010, vol. 6, pp. 3924-3929.

Menguc, Yigit et al., Gecko-Inspired Controllable Adhesive Structures Applied to Micromanipulation, Adv. Funct. Mater., 22:1246-1254; doi 10.1002/adfm.201101783.

Menguc, Yigit et al., Staying Stickey: Contact Self-Cleaning of Gecko-Inspired Fibrillar Adhesives, 2012, available at http://people.seas.harvard.edu/~ymenguc/research.html/ last visited Feb. 25, 2013.

Rivas, Juan (2004), Radio Frequency dc-dc Power Conversion, (Doctorate thesis), Department of Electrical Engineering and Computer Science, Massachusetts Institute of Technology, Sep. 2006.

European Search Report issued in European Application No. 14156154.8 on Aug. 18, 2014, 9 pages.

Bright, V.M., et al., "Prototype Microrobots for Micro Positioning in a Manufacturing Process and Micro Unmanned Vehicles," Micro Electro Mechanical Systems, 1999. MEMS '99. Twelfth IEEE International Conference, Jan. 17-21, 1999, pp. 570-575.

Byungkyu, Kim et al., "A Ciliary Based 8-Legged Walking Micro Robot Using Cast IPMC Actuators," Proceedings /2003 IEEE International Conference on Robotics and Automation, Sep. 14-19, 2003, pp. 2940-2945.

Liwei, Shi et al., "A Novel Soft Biometic Microrobot with Two Motion Attitudes," Sensors, vol. 12, No. 12, Dec. 6, 2012, pp. 16732-16758.

Tan, John L. et al.; Cells Lying on a Bed of Microneedles: An Approach to Isolate Mechanical Force; PNAS; vol. 100; No. 4; Feb. 18, 2003; pp. 14884-1489.

EP Extended Search Report for related matter 14-1554683.3-1356 dated Sep. 19, 2014, 10 pp.

Liou, Dar-Sun et al., Axial Particle Displacements in Fluid Slugs After Passing a Simple Serpentiform Microchannel, Nicrofluid Nanofluid, 2009, 7:145-148.

Xu, J., et al., Microphone Based on Polyvinylidene Fluoride (PVDF) Micro-Pillars and Patterned Electrodes, Sensors and Actuators, 2009, A153:24-32.

Gallego-Perez, Daniel et al., Versatile Methods for the Fabrication of Polyvinylidene Fluoride Microstructures; Biomed Microdevices, 2010, 12:1009-1017.

Höfling, S. et al.; Semiconductor Quantum Light Emitters and Sensors; Quantum Sensing and Nanophotonic Devices VII; Proc. of SPIE vol. 7608; pp. 760804-1-760804-9; © 2010 SPIE.

Ghanbari, A. et al.; A Micropillar-based On-chip System for Continuous Force Measurement of C. elegans; Journal of Micromechanics and Microengineering; Published Jul. 26, 2012; pp. 1-10; © 2012 IOP Publishing Ltd.

Chan, Yu Fei et al., Electroluminescence from ZnO-Nanofilm/Simicropillar Heterostructure Arrays, Optics Express, vol. 20, No. 22, pp. 24280-24287, 2012.

Microfluids; http://www.imec.bc/ScientificReport/SR2010/2010/1159254.html; 6 pages; 2010; retrieved from internet Jan. 14, 2013.

Hiraoka, M. et al; Integrated Fluidic System for Bio-Molecule Separation; 32nd Annual International Conference of IEEE EMBS; pp. 6514-6517; Buenos Aires, Argentina; Aug. 31-Sep. 4, 2010.

Cheng, D. et al.; A Sensing Device Using Liquid Crystal in a Micropillar Array Supporting Structure; Journal of Microelectromechanical Systems; vol. 18, No. 5; pp. 973-982; Oct. 2009.

EP Extended Search Report for related matter 14155371.9 dated May 15, 2015; 9 pages.

Zhang, Yang et al.; MEMS Optical Acoustic Sensors Manufactured in Laminates; Electronic Components and Technology Conference (ECTC), 2011 IEEE 61st, IEEE, May 31, 2011, pp. 230-235.

Long, Zhou; Newly-Developed Nanostructured Microcantilever Arrays for Gas-Phase and Liquid-Phase Sensing; Graduate School; Doctoral Dissertations; May 1, 2010; pp. 1-133.

Xu, T. et al.; Polymeric Micro-Cantilever Array for Auditory Front-End Processing; Sensors and Actuators A; 2004; vol. 114; pp. 176-182.

Fritz, J. et al.; Translating Biomolecular Recognition into Nanomechanics; Science Magazine; Apr. 14, 2000; vol. 288; pp. 316-319.

Canada Office Action for related application 2,841,564 dated Nov. 27, 2015; 3 pp.

\* cited by examiner

FILTRATION SYSTEMS AND METHODS FOR FILTERING PARTICLES OF A PREDETERMINED SUBSTANCE

BACKGROUND

The present disclosure relates generally to filtration systems and, more specifically to filtration systems for use in filtering particles of a similar size.

At least some known filtration systems are used to physically separate entrained particulates from a flow of fluid. Generally, filtration systems include a filter media positioned in the path of fluid flow. The filter media is selected to separate predetermined particulates from the fluid flow. More specifically, at least some known filter media include one or more layers of material having pores defined therein. The pores defined within each layer are sized to only permit particulates of a particular size to pass therethrough. As such, during operation, at least some known filtration systems simultaneously permit the passage of predetermined particulates through the pores while collecting particulates of a larger size on the surface of the filter media.

While at least some known filtration systems are generally effective at separating particulates of different sizes, such systems may become clogged after prolonged use, thereby resulting in an increased pressure drop across the filter media. Filter media used in known filtration systems may be configured for one-time use resulting in disposal of the filter media, or may be re-used after being cleaned and unclogged with processes such as a reverse pulse cleaning process. However, cleaning processes generally require a temporary shutdown of the overall system coupled to the filtration system, and may undesirably result in damage to the filter media. Moreover, filter media that have predetermined pore sizes are generally ineffective at filtering particulates of a similar size.

BRIEF DESCRIPTION

In one aspect, a filtration system is provided. The filtration system includes a filter media including a plurality of apertures defined therein, and an array of micropillars. Each micropillar is substantially aligned with one of the plurality of apertures and is configured to be repelled by particles of a predetermined substance entrained in a flow channeled through the filtration system.

In another aspect, a filtration system is provided. The filtration system includes a repository, and an array of micropillars. Each micropillar in the array is configured to attract particles of a predetermined substance entrained in a flow channeled through the filtration system and transfer the attracted particles to the repository.

In yet another aspect, a method for filtering particles of a predetermined substance entrained in a flow is provided. The method includes positioning an array of micropillars in a path of flow, and applying stimuli to the micropillars to selectively remove particles of the predetermined substance from the flow.

DETAILED DESCRIPTION

Implementations of the present disclosure relate to filtration systems and methods of filtering particles of a predetermined size. The filtration systems described herein include an array of micropillars that selectively remove different particles of the predetermined size that are entrained in a flow of fluid when the micropillars are subjected to a stimuli. In the exemplary implementations, the micropillars are either repelled by, or attract the entrained predetermined particles thereto. The repulsion or attraction may be induced by at least one of an electric field and/or a magnetic field created between the particles and the micropillars, and the forces generated therefrom. As such, the filtration systems described herein facilitate separating particles from a flow of fluid based on characteristics of the particles other than their size. Moreover, micropillars are used in the exemplary implementations due to their ability to be fabricated in the micrometer and sub-micrometer ranges, their ability to be activated using a variety of external stimuli, and their ability to return to their original form after the stimuli is removed.

In one implementation, the micropillars are substantially aligned with apertures defined in a filter media, and each micropillar includes a coating that facilitates creating repulsion between the predetermined particles and the micropillars. More specifically, the coating is applied to a free end of the micropillars. The free end of each micropillar is misaligned with a respective aperture as the predetermined particles come in close contact with the coating. As such, the particles may be separated from the fluid flow by passing through the apertures exposed by the repelled micropillars. In another implementation, the micropillars include a coating that facilitates attracting the predetermined particles to the micropillars. The attracted particles couple to the micropillars and are transferred to a repository. As such, each filtration system described herein separates entrained particles from fluid using attraction and/or repulsion between the particles and micropillars such that particles of different substances having a substantially similar size may be separated.

Figure 1:
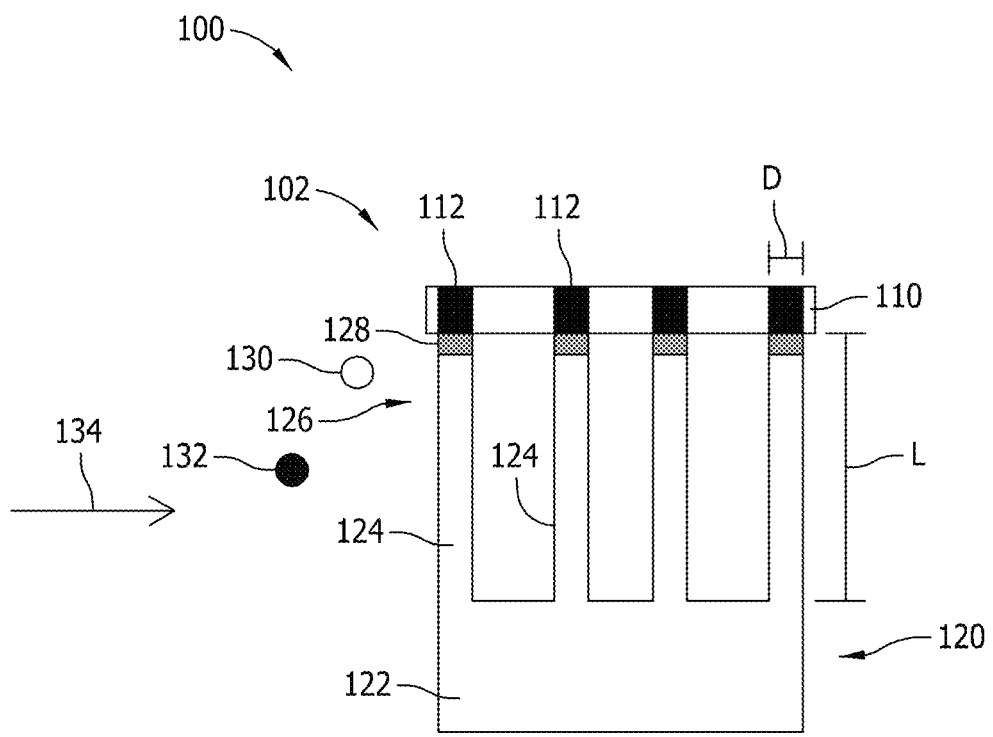
FIG. 1 is a schematic illustration of an exemplary filtration system in a first operational position.
Figure 2:
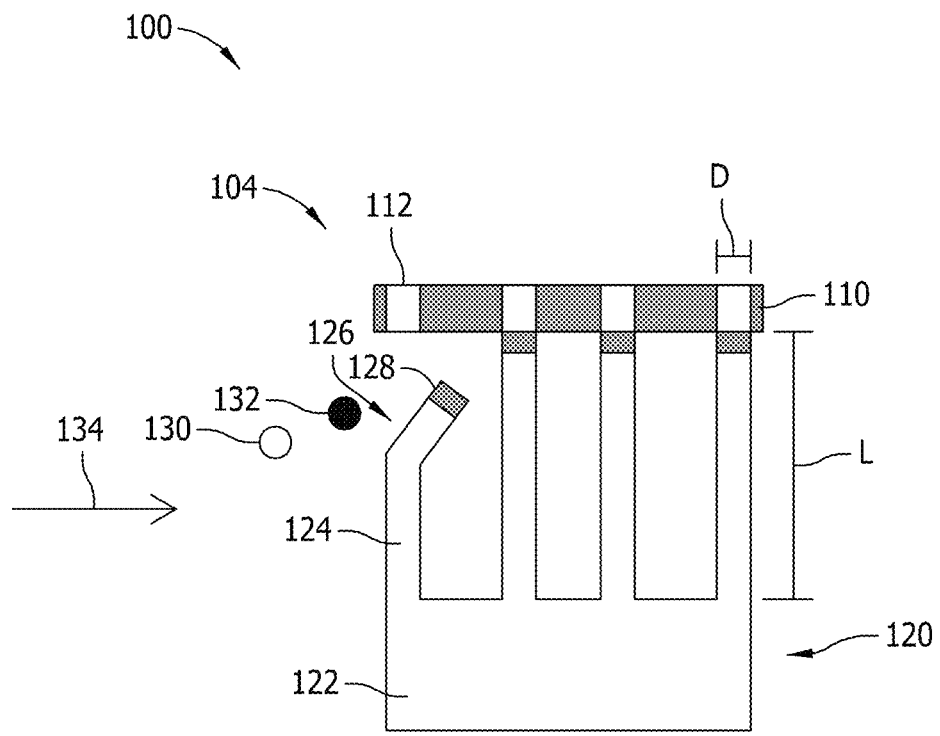
FIG. 2 is a schematic illustration of the filtration system shown in FIG. 1 in a second operational position.

FIG. 1 is a schematic illustration of an exemplary filtration system 100 in a first operational position 102, and FIG. 2 is a schematic illustration of filtration system 100 in a second operational position 104. In the exemplary implementation, filtration system 100 includes a filter media 110 and a micropillar array 120 that is substantially aligned with filter media 110. More specifically, filter media 110 includes a plurality of apertures 112 defined therein, and micropillar array 120 includes a base 122 and a plurality of micropillars 124 that extend from base 122. In one implementation, micropillars 124 extend from base 122 and each is aligned with a respective aperture 112 defined in filter media 110. As such, when filtration system 100 is in the first operational position, micropillars 124 are each substantially aligned with apertures 112 such that particles 130 of a first substance and particles 132 of a second substance may not pass therethrough.

Micropillars 124 may be fabricated from any suitable material that enables filtration system 100 to function as described herein. More specifically, micropillars 124 may be fabricated from any suitable material that enables micropillars 124 to bend when subjected to stimuli such as electric, magnetic, or electromagnetic forces. Exemplary suitable materials include, but are not limited to, diphenylalanine peptide nanotubes (PNTs), and polyvinylidene fluoride (PVDF). Further, micropillars 124 may have any suitable dimensions that enable filtration system 100 to function as described herein. For example, micropillars 124 may have a diameter that corresponds to a diameter D of apertures 112 defined within filter media 110. More specifically, micropillars 124 are sized to substantially block the passage of particles 130 and 132 through apertures 112 when micropillars 124 are aligned therewith. Further, in some implementations, micropillars 124 have a length L that enables a free end 126 of micropillars 124 to be inserted at least partially into apertures 112 when micropillars 124 are aligned therewith.

In the exemplary implementation, a fluid flow 134 is channeled towards filtration system 100. Particles 130 of a first substance and particles 132 of a second substance are entrained in fluid flow 134. In the exemplary implementation, particles 130 and 132 are substantially similarly sized such that they cannot be separated using a traditional filter media having pores of a predetermined size defined therein. Accordingly, in the exemplary implementation, particles 130 of first substance are unreactive with micropillars 124, and particles 132 of second substance react with micropillars 124 to facilitate selective removal of particles 132 from fluid flow 134.

More specifically, in the exemplary implementation, the free end 126 of each micropillar 124 includes a coating 128 applied thereon that is selected to be unreactive with particles 130 of first substance and reactive with particles 132 of second substance. In each implementation described herein, coating 128 may include any suitable substance that enables filtration system 100 to function as described herein. More specifically, the selected substance reacts with particles 132 via any suitable method that enables filtration system 100 to function as described herein. In some implementations, the reaction may be induced by stimuli such as forces generated by either an electric field and/or a magnetic field induced between particles 132 and coating 128. For example, in one implementation, particles 132 of the predetermined substance have either a positive or negative charge, and coating 128 has the same charge as particles 132. As such, the opposing fields of particles 132 and coating 128 facilitate repelling micropillars 124 out of alignment with apertures 112. In alternative implementations, coating 128 is applied to the entire surface of micropillars 124.

In operation, micropillar array 120 is positioned in a path of fluid flow 134 that is channeled towards micropillar array 120. In some implementations, micropillars 124 extend in a substantially transverse direction with respect to the fluid flow 134 direction. As shown in FIG. 1, micropillars 124, and more specifically coating 128 applied to micropillars 124, are unreactive with particles 130 of the first substance. As such, each micropillar 124 maintains its alignment with and substantially blocks each respective aperture 112 such that particles 130 are unable to pass therethrough. In alternative implementations, a plurality of micropillar arrays 120 are positioned in the path of fluid flow 134 in a series of stages.

Referring now to FIG. 2, when particles 132 of the second substance are channeled towards and/or positioned in close proximity to coating 128, filtration system 100 moves into the second operational position. More specifically, in the exemplary implementation, coating 128 repelled by particles 132 which causes free end 126 to misalign from aperture 112, such that aperture 112 is exposed to fluid flow 134. In some implementations, aperture 112 is sized to enable the passage of particles 132 therethrough. As such, when micropillars 124 are misaligned from apertures 112, particles 132 of second substance flow through apertures 112. After each particle 132 passes through aperture 112, filtration system 100 returns to the first operational position as shown in FIG. 1. More specifically, micropillars 124 return to their original orientation wherein each is substantially re-aligned with respective apertures 112, and such that the passage of fluid flow 134 therethrough is substantially prevented.

Figure 3:
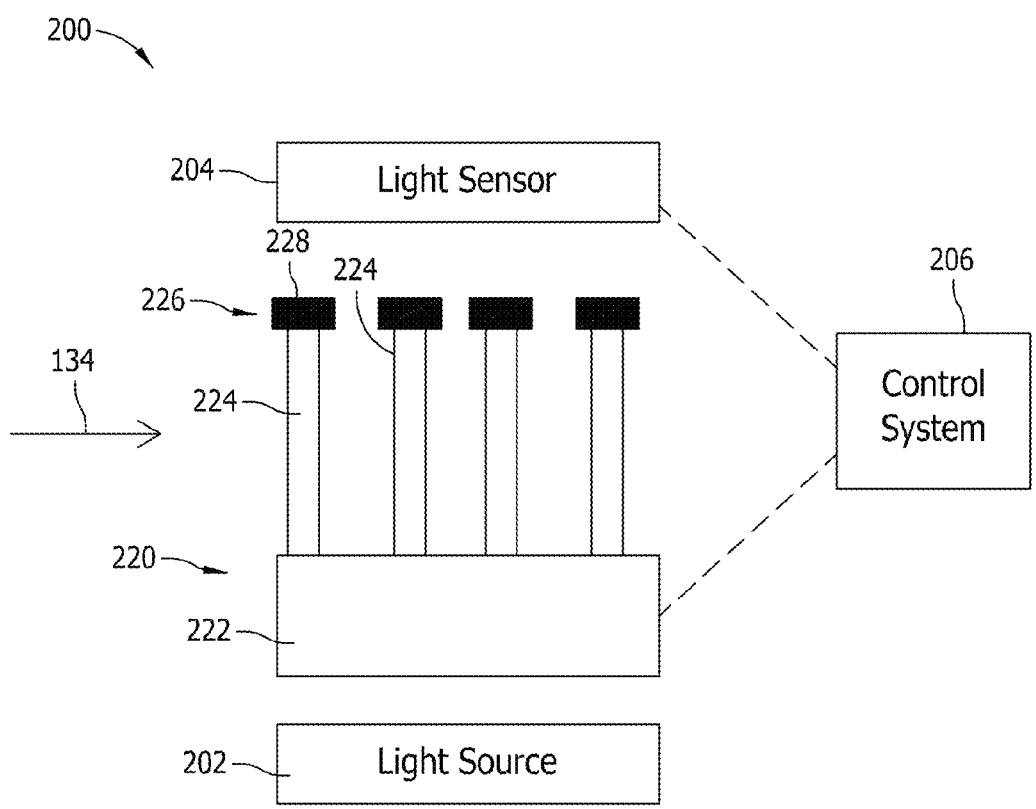
FIG. 3 is a schematic front view illustration of an alternative filtration system in a first operational position.
Figure 4:
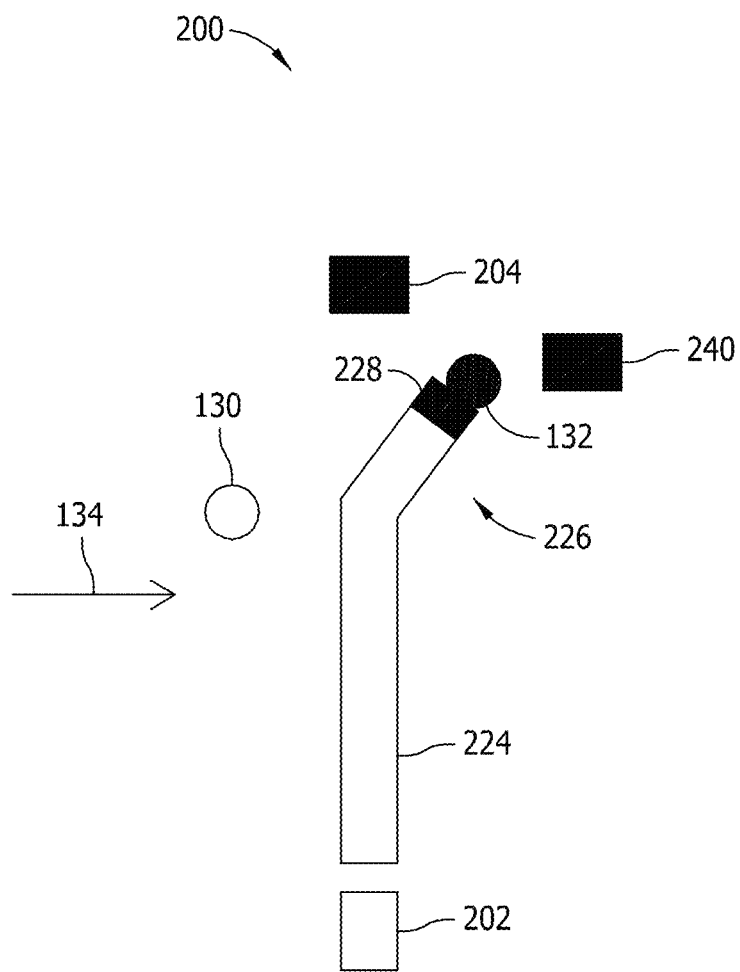
FIG. 4 is a schematic side view illustration of the filtration system shown in FIG. 3 in a second operational position.

FIG. 3 is a schematic front view illustration of another exemplary filtration system 200 in a first operational position, and FIG. 4 is a schematic side view illustration of filtration system 200 in a second operational position. In the exemplary implementation, filtration system 200 includes a light source 202, a light sensor 204, and a micropillar array 220 positioned therebetween. More specifically, micropillar array 220 includes a base 222 and a plurality of micropillars 224 extending from base 222 towards light sensor 204. In some implementations, light source 202 directs light towards light sensor 204 through micropillars 224 of array 220, and micropillars 224 attract and remove particles 132 from fluid flow 134.

Micropillars 224 may be fabricated from any suitable material that enables filtration system 200 to function as described herein. More specifically, micropillars may be fabricated from any suitable material that enables micropillars 224 to bend when subjected to stimuli such as an applied voltage or heat. In the exemplary implementation, micropillars 224 are fabricated from piezoelectric material that is activated when a voltage is applied thereto. Exemplary suitable piezoelectric material includes, but is not limited to, naturally occurring crystalline material, synthetic crystalline material, and synthetic ceramic material.

In the exemplary implementation, a coating 228 is applied to a free end 226 of micropillars 224 that reacts with particles 132 via any suitable method that enables filtration system 200 to function as described herein. In some implementations, the reaction may be induced by either an electric field and/or a magnetic field induced between particles 132 and coating 228. For example, in one implementation, particles 132 of the predetermined substance have either a positive or negative charge and coating 228 has an opposite charge from particles 132. As such, the fields of particles 132 and coating 228 facilitate attracting particles 132 to micropillars 224 such that particles 132 may be transferred to a particle repository 240 positioned adjacent to micropillar array 220.

In operation, micropillar array 220 is positioned in a path of fluid flow 134 that is channeled towards micropillar array 220. In some implementations, micropillars 224 extend in a substantially transverse direction with respect to the fluid flow 134 direction. Micropillars 224, and more specifically coating 228 applied to micropillars 224, are unreactive with particles 130 of the first substance. As such, micropillars 224 remain in a substantially straight orientation until particles 132 of the second substance are positioned in close proximity to micropillars 224. In alternative implementations, a plurality of micropillar arrays 220 are positioned in the path of fluid flow 134 in a series of stages.

Referring now to FIG. 4, when particles 132 of the second substance are channeled towards and/or positioned in close proximity to coating 228, filtration system 200 moves into the second operational position. More specifically, in the exemplary implementation, coating 228 attracts particles 132 to micropillars 224. As particles 132 increasingly accumulate on the surface of micropillars 224, the light directed through micropillar array 220 from light source 202 becomes increasingly blocked by the accumulation of particles 132. As such, the amount of light received at light sensor 204 decreases accordingly.

In some implementations, light sensor 204 is coupled in communication with a control system 206 that is configured to activate micropillars 224 when the luminous intensity of the light received at light sensor 204 decreases to a predetermined level. More specifically, when micropillars 224 are fabricated from piezoelectric material, control system 206 selectively applies a voltage stimuli to micropillars 224 to activate them when the predetermined level is reached. In each exemplary implementation, the predetermined level of luminous intensity may be selected to be any suitable level that enables filtration system 200 to function as described herein.

In the exemplary implementation, control system 206 activates micropillar array 220 to transfer the accumulated particles 132 to particle repository 240. More specifically, when the luminous intensity reaches the predetermined level, control system 206 applies a voltage to bend micropillars 224 towards particle repository 240. In some implementations, micropillars 224 bend in a direction opposite the applied voltage. More specifically, the piezoelectric material responds to the applied voltage, which bends micropillars 224 in a direction opposite the applied voltage. Particle repository 240 removes particles 132 from micropillars 224 by overcoming a force of attraction therebetween. Once particles 132 have been removed by particle repository 240, the luminous intensity detected by light sensor 204 increases above the predetermined level and control system 206 deactivates micropillars 224 and returns them to their original orientation.

Particle repository 240 is configured to remove particles 132 from micropillars 224 by any suitable method that enables filtration system 200 to function as described herein. Exemplary suitable removal methods include, but are not limited to, a suction method, magnetic attraction, and removal by electrostatic repulsion.

Figure 5:
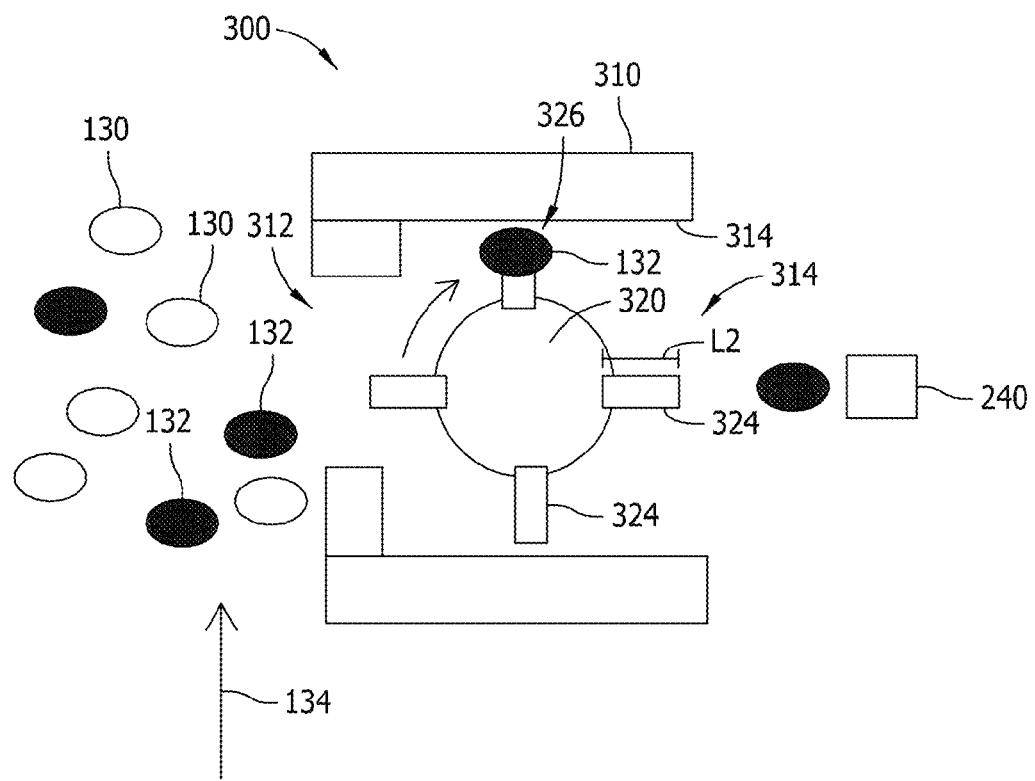
FIG. 5 is a schematic illustration of a further alternative filtration system.

FIG. 5 is a schematic illustration of a side view of an exemplary filtration system 300. In the exemplary implementation, filtration system 300 includes a housing 310 and a cylindrical body 320 that rotates within housing 310. Housing 310 includes an inlet 312 and an outlet 314 defined therein, wherein inlet 312 is defined adjacent to fluid flow 134 and outlet 314 is defined adjacent to particle repository 240. In the exemplary implementation, housing 310 and inlet 312 are configured to block at least some particles 132 and 134 from flowing past body 320. Further, micropillars 324 are circumferentially spaced about cylindrical body 320, and selectively remove particles 132 of a predetermined substance entrained in fluid flow 134. In some implementations, micropillars 324 include a coating (not shown) that attracts particles 132 thereto.

In operation, particles 132 are attracted to micropillars 324 as fluid flow 134 is channeled past inlet 312. Micropillars 324 are reactive with and attract particles 132 of the second substance, and are unreactive with particles 130 of the first substance. Further, cylindrical body 320 rotates such that micropillars 324 having attracted particles 132 collected thereon are moved out of alignment with inlet 312, and moved into alignment with outlet 314. Collected particles 132 are then removed by particle repository 240 through outlet 314.

Particles 132 are removed from micropillars 324 by any suitable method that enables filtration system 300 to function as described herein. Exemplary suitable removal methods include, but are not limited to, a suction method, magnetic attraction, and removal by electrostatic repulsion. Moreover, in one implementation, micropillars 324 are configured to have a length L2 that enables particles 132 to be removed by scraping a free end 326 of micropillars 324 against an inner surface 314 of housing 310 as cylindrical body 320 is rotated. As such, filtration system 300 continuously removes particles 132 from fluid flow 134 with the rotation of cylindrical body 320.

The filtration systems and method described herein enable selective removal of particles of a predetermined substance from a flow of fluid even when other particles in the fluid flow have a substantially similar size as the predetermined particles. In the exemplary implementations, the filtration systems include an array of micropillars that only react with particles of the predetermined substance. For example, in some implementations, the reaction between the particles and the micropillars is induced by either an electric field and/or a magnetic field, and the forces generated therefrom. The particles that react with the micropillars are then removed from the fluid flow by passing through exposed apertures defined in a filter media and/or by being deposited in a particle repository. As such, the filtration systems described herein selectively remove particles of the predetermined substance based on factors other than the size of the particles to be filtered.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A filtration system comprising:
   a filter media comprising a plurality of apertures defined therein; and
   an array of micropillars, each said micropillar is substantially aligned with one of said plurality of apertures and is configured to be repelled by particles of a predetermined substance entrained in a flow channeled through said filtration system.

2. The filtration system in accordance with claim 1, wherein each micropillar comprises a free end that is sized to block a respective aperture when each micropillar aligns with a respective aperture of the plurality of apertures.

3. The filtration system in accordance with claim 2, wherein each said free end is displaceable from being aligned with each said aperture when said micropillar is repelled by the particles of the predetermined substance.

4. The filtration system in accordance with claim 3, wherein each of said plurality of apertures is exposed and unobstructed by one of said micropillars when said free end is displaced to enable the particles of the predetermined substance to flow through said filter media.

5. The filtration system in accordance with claim 4, wherein each micropillar of said array of micropillars are configured to substantially re-align with one of said plurality of apertures when the particles of the predetermined substance are removed through said filter media.

6. The filtration system in accordance with claim 1, wherein each micropillar of said array of micropillars comprise a coating configured to be repelled by the particles of the predetermined substance.

7. The filtration system in accordance with claim 6, wherein said coating comprises a substance having a charge that is the same as a charge of the particles of the predetermined substance.

8. A filtration system comprising:
a repository; and
an array of micropillars, wherein each said micropillar in said array is configured to attract particles of a predetermined substance entrained in a flow channeled through said filtration system and transfer the attracted particles to said repository, wherein an orientation of each said micropillar is selectively modified when stimuli is applied thereto such that the attracted particles are transferred to said repository.

9. The filtration system in accordance with claim 8 further comprising a light source and a light sensor positioned on opposing sides of said array of micropillars, wherein said light source directs light towards said light sensor through said micropillars.

10. The filtration system in accordance with claim 9, wherein said micropillars are configured to bend towards said repository when the attracted particles reduce an amount of light received at said light sensor to a predetermined level.

11. The filtration system in accordance with claim 10, wherein said micropillars are configured to return to an original orientation when the attracted particles are transferred to said repository.

12. The filtration system in accordance with claim 8, wherein each said micropillar in said array comprises a coating configured to attract the particles of the predetermined substance.

13. The filtration system in accordance with claim 12, wherein said coating comprises a substance having a charge that is opposite a charge of the particles of the predetermined substance.

14. The filtration system in accordance with claim 8, wherein said repository removes the attracted particles from said micropillars by overcoming a force of attraction between the attracted particles and said micropillars.

15. The filtration system in accordance with claim 8 further comprising:
a housing that comprises an inlet and an outlet defined therein, wherein the outlet is positioned adjacent to said repository; and
a cylindrical body configured to rotate within said housing, wherein said micropillars are circumferentially spaced about said cylindrical body and configured to collect the particles of the predetermined substance when said micropillars are aligned with the inlet and configured to release the particles when the micropillars are aligned with the outlet.

16. A method for filtering particles of a predetermined substance entrained in a flow, said method comprising:
positioning an array of micropillars in a path of flow; and
applying stimuli to the micropillars to selectively modify an orientation of the micropillars and selectively remove the particles of the predetermined substance from the flow.

17. The method in accordance with claim 16 further comprising configuring the micropillars to at least one of attract or be repelled by the particles of the predetermined substance.

18. The method in accordance with claim 16, wherein the applying stimuli to the micropillars comprises orienting the micropillars from a substantially straight configuration to a bent configuration when selectively removing the particles of the predetermined substance from the flow.

19. The method in accordance with claim 18, wherein the orienting the micropillars further comprises returning the micropillars from the bent configuration to the substantially straight configuration after the particles of the predetermined substance are removed from the flow.

20. The method in accordance with claim 16, wherein positioning an array of micropillars comprises orienting the array such that the micropillars extend transversely with respect to a direction of the flow.

* * * * *